United States Patent Office 3,402,013
Patented Sept. 17, 1968

3,402,013
PROCESS FOR DYEING NICKEL-MODIFIED POLYOLEFIN MATERIALS
Hiroshi Sugiyama, Ashiya-shi, Takuo Ikeda, Amagasaki-shi, Takashi Chinuki, Toyonaka-shi, and Hideo Otsuka, Nishinomiya-shi, Japan, assignors to Sumitomo Chemical Company, Ltd., Osaka, Japan, a corporation of Japan
No Drawing. Filed Apr. 16, 1965, Ser. No. 448,889
Claims priority, application Japan, Apr. 17, 1964, 39/21,704
10 Claims. (Cl. 8—42)

ABSTRACT OF THE DISCLOSURE

The invention is dyeing polyethylene and polypropylene fibers with nickel compounds blended therein by applying an O-hydroxy-O'-alkoxybenzeneazonaphthol dye to the fibers. The benzene nucleus is further substituted with methyl, chloro, and alkoxy groups. 2-methoxy-5-methylaniline, 2,5-dimethoxyaniline, 2,5-diethoxyaniline, 2,4-dimethoxyaniline and 2-methoxy-4-methylaniline are used for coupling with beta-naphthol to form the O-hydroxy-O'-alkoxyazonaphthol. The electron donor groups, such as alkyl and alkoxy groups, particularly the alkoxy-group in the para-position on the benzene ring, increase the electron density on the oxygen atom of the ortho-to-the-azo-bond alkoxy group to assist and enhance the coordinate bonding of the fiber occluded nickel atom in a chelate structure and, thus, increase dye fastness.

---

This invention relates to a process for dyeing nickel-modified polyolefin materials, more particularly it relates to a process for dyeing polyolefin materials contaning nickel in the form of a salt or complex in red shade with high fastnesses to light, washing, rubbing and dry cleaning.

Fibers and the like articles made of polyolefins such as polyethylene and polypropylene are highly hydrophobic and have no polar groups to serve as points of attachment or anchor sites for dyes and hence show a so-called dye-resistant property. In this connection, various efforts have been made in order to obtain good dyed products of polyolefin by the method of chemical treatment, blending and by selection of dyes. Among these, there are efforts made to obtain such dyed products by incorporating into the polyolefin a metal in the form of a salt or complex as an antioxidant, stabilizer or a dyeability-improving agent, by mix-shaping or mix-spinning method and then dyeing the resulting shaped article or fiber with dyes coordinatable with said metal. For example, British Patent No. 935,125 and Belgian Patent No. 614,566 (I.C.I.) disclose in their examples the applicaation of various dyes to several metal-modified polyolefins.

However, the dyes coordinatable with metals do not always give excellent dyed products of polyolefin, but the dyeability varies depending on the structure of dyes, and the combination of the dyes with the metals contained in polyolefins. That is, among dyes having favorable dyeing effects on polyolefins modified with a certain metal, there are those giving no favorable result in dyeability or fastness, particularly to light, to polyolefins modified with other metal. It is therefore possible to say that, in the dyeing of metal-modified polyolefin materials, the effectiveness of dyeing is attained only in the case of a specific combination of the structure of dye and the metal contained in the polyolefin material. Various dyes for nickel-modified polyolefin materials have heretofore been proposed but, in the field of red color dyes, there were no satisfactory ones. In this connection, the dyes employed in the present invention are considered particularly useful.

One object of the present invention is to provide a process for dyeing textiles, fibers, films, filaments and the like shaped articles made of nickel-modified polyolefin materials such as polyethylene and polypropylene in red shade with fastnesses to light, washing, rubbing and dry cleaning. Another object is to provide textiles, fibers, films, filaments and the like shaped articles made of nickel-modified polyolefin materials such as polyethylene and polypropylene which are dyed in red shade with a monoazo dye as mentioned below. Other objects would be apparent from the following descriptions.

In order to accomplish these objects the present invention provides a process for dyeing nickel-modified polyolefin material which comprises applying thereto a monoazo dye having the following general formula:

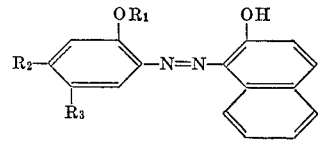

wherein $R_1$ is a lower alkyl radical having 1 to 2 carbon atoms, and one of $R_2$ and $R_3$ is hydrogen atom and the other is a member selected from the group consisting of lower alkyl radicals having 1 to 4 carbon atoms and lower alkoxy radicals having 1 to 2 carbon atoms. Further the present invention provides an article made of a nickel-modified polyolefin material, which is dyed with a monoazo dye having the following general formula:

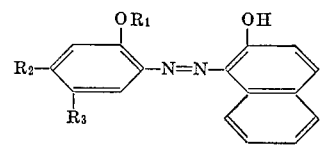

wherein $R_1$ is a lower alkyl radical having 1 to 2 carbon atoms, and one of $R_2$ and $R_3$ is hydrogen atom and the other is a member selected from the group consisting of lower alkyl radicals having 1 to 4 carbon atoms and lower alkoxy radicals having 1 to 2 carbon atoms.

Such monoazo dyes may also be represented as having the following formula:

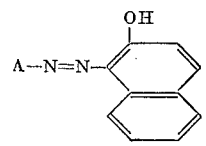

wherein A is selected from the group consisting of

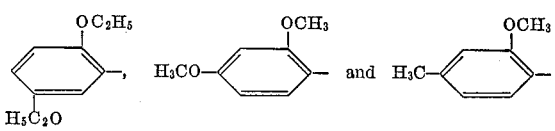

In the course of the research of various dyes to be applied to metal-modified polyolefin materials, the present inventors have found that the dyes represented by the aforesaid general formula show particularly favorable affinity for the nickel-modified polyolefin materials to give dyed products in red shade which are markedly excellent in fastnesses to light, washing, rubbing and dry cleaning.

As to the nickel-modified polyolefin materials employed in the present invention, nickel to be contained in polyolefins is incorporated, before the shaping or spinning step of the polyolefins, in a finely divided state and in the form of a salt of higher fatty acid such as stearic or oleic acid, or a complex of ethyl acetoacetate, acetylacetone, 8-hydroxyquinoline, or thiobisphenol.

The dyes employed in the method of the present invention are prepared by diazotizing according to conventional process an aniline derivative represented by the following general formula:

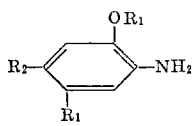

wherein $R_1$, $R_2$ and $R_3$ have the same meanings as defined above, and then coupling the diazotized product with β-naphthol. The dyes thus obtained, which may be used in a mere mechanically pulverized state, are desirably employed in the form of dispersions by incorporating during the synthesis an appropriate dispersing agent or admixing the dyes with alkylnaphthalenesulfonic acid formaldehyde-condensate or the like.

The typical examples of aniline derivatives to be used as the diazo component include 2-methoxy-5-methylaniline, 2,5-dimethoxyaniline, 2,5-diethoxyaniline, 2,4-dimethoxyaniline and 2-methoxy-4-methylaniline.

It is well known that, in the preparation of complex dyes by coordinating metals with azo dyes, O,O'-dihydroxyazo dyes are most commonly employed, in general, and are applied to polyolefins modified with metals such as nickel. (Refer to, for example, British Patent 935,125; "Senshoku Kogyo" (Dyeing Industry), vol. 11, pages 502–505; and Belgian Patent 632,652.)

According to the investigation of the present inventors, however, said dyes do not always give satisfactory results. This is considered ascribable to the fact that, even if the dyes possess high coordination ability with metals incorporated in highly hydrophobic polyolefins, they are more or less difficultly transferred into fiber layers, due chiefly to the polarity of hydroxy groups.

In contrast, the O-hydroxy-O'-alkoxyazo dyes to be used in the present invention, though which are considered inferior to said O,O'-dihydroxyazo dyes in coordination ability with metals or in strength of the resulting coordination bond, give favorable results when metals are present in such hydrophobic media as polyolefins, by virtue of the compatibility of the dyes with polyolefin layers. In the case of the O,O'-dihydroxyazo dyes, a reaction of forming a complex of dye and metal occurs even in such a hydrophobic medium as polyolefin. This has been substantiated by the fact that the resulting color tone is made deep. It is, however, considered that, in the case of the O-hydroxy-O'-alkoxyazo dyes as used in the present invention, the mode of coordination bond is such that there is little possibility that the alkyl portion of alkoxyl group has been released by the formation of coordination bond, and a weak coordination bond between nickel atom and the oxygen atom of alkoxy group has been formed in addition to the relatively strong coordination bond between nickel and O-hydroxyazo group. Accordingly, in the case of an electron donor group, such as alkyl or alkoxy group is present in the nucleus of the diazo component, particularly in the p-position of the alkoxy group, like in the case of the substituted aniline derivatives employed in the synthesis of the dyes to be used in the present invention, the electron density on the oxygen atom of alkoxy radical is increased, whereby the coordination bond is made somewhat strong to give a particularly favorable dyed product.

Further, it is known that O-hydroxyazo dyes (having no substituent in O'-position), which are considered more excellent in compatibility with polyeolefin layers, are applicable as well to metal-modified polyolefins (refer to, for example, British Patent 935,125). In the above case, a dyed product in high concentration is obtained owing to the high compatibility, but since no coordination bond of the type as seen in the case of O,O'-dihydroxyazo dyes or O-hydroxy-O'-alkoxyazo dyes is formed, the resulting dyed product is inferior in most cases in fastness, particularly to dry cleaning. As mentioned above, it is deemed that the O-hydroxy-O'-alkoxyazo dyes employed in the present invention show a suitable degree of harmony in compatibility with polyolefin layer, coordination bond-forming ability and stability of formed complex, to make it possible to obtain particularly excellent dyed products.

In accordance with the present invention the dyeing is effected, like in the case of ordinary dispersion dyes, in an aqueous medium at 70°–120° C. in the presence of at least one of anionic and nonionic surface active agents.

The form of the metal contained in polyolefin materials scarcely affects the properties of the dyed product obtained in accordance with the present invention and is a minor matter, in practice.

It is surprising that the dyes are easily converted into complex during dyeing, even when nickel complex previously incorporated in polyolefins are markedly high in stability, like nickel complex of 8-hydroxyquinoline for example.

The following examples illustrate the present invention, but do not limit it.

Example 1

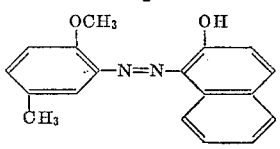

Using 3% OWF of a dye represented by the above structural formula a polypropylene fiber mix-spun with 1% by weight of nickel stearate was dyed at 100° C. for 1 hour in a bath (bath ratio, 50:1) comprising 1 g./l. of a polyethylene glycol alkylphenyl ether as a nonionic surface active agent and 1 g./l. of a polyethylene glycol alkylphenyl ether sulfate as an anionic surface active agent. After dyeing, the fiber was subjected to soaping at 70° C. for 10 minutes in a bath (bath ratio 40:1) comprising 1 g./l. of a sulfuric acid ester of higher alcohol as an anionic surface active agent, whereby a favorable dyed product in red shade was obtained. The dyed fiber was excellent in fastnesses to light (5<) (ISO R105–1959 Fade-O-Meter) washing (5) (ISO TC38/SCI–1962 Test 3) and dry cleaning (5) (ISO R105–1959 Perclene).

In similar way as above, a polypropylene fiber containing 1% of nickel ethyl acetoacetate was dyed to obtain an excellent dyed product showing the same color tone and fastnesses as above.

Comparative experiment (a) The above dye was applied to a polypropylene fiber containing 1% of zinc stearate to obtain a dyed product which was favorable in dyeability but the light fastness of which was 1 grade and was greatly inferior to the above nickel-modified case.

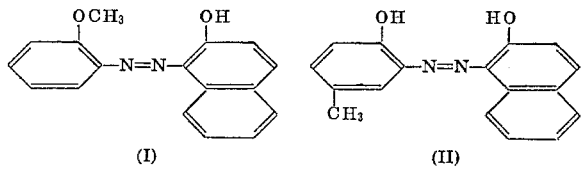

(I)            (II)

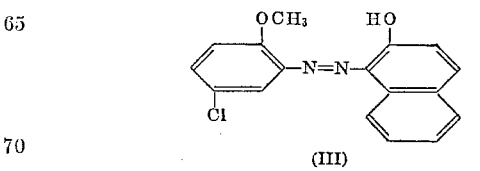

(III)

(b) A dye represented by the structural Formula I was used to dye the aforesaid nickel stearate-containing polypropylene fiber in similar way as described above, whereby the fiber was dyed in red shade but was low in color value and was obviously inferior in fastness to the above case using the dye of the present invention, showing fastnesses to light (4) and dry cleaning (4) respectively.

(c) In the case that nickel-modified polypropylene fiber was dyed with a dye represented by the above structural Formula II, the dyeability was further degraded and only a low color value was attained. The dyed product was inferior to the aforesaid case using the dye of the present invention, showing the fastness to light (1) and the fastness to dry cleaning (3).

(d) In the case that nickel-modified polypropylene fiber was dyed with a dye represented by the structural Formula III, the color value was further low and the dyed product was obviously inferior to the above case using the dye of the present invention, exhibiting merely a light pink color.

Example 2

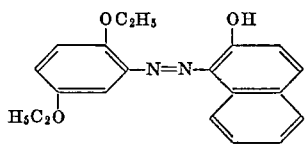

Using a dye represented by the above structural formula, a nickel stearate-containing polypropylene fiber was dyed in similar way as in Example 1 (the amount of the dye was 3% OWF), whereby a dyed product in red shade was obtained. The product was excellent in fastnesses to light (5) washing (5), and dry cleaning (5) using Perclene.

Comparative experiment

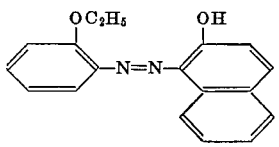

A dye represented by the above structural formula was employed to dye, in similar way as above, a nickel stearate-containing polypropylene fiber in red shade which was low in color value and the fastnesses were evidently inferior to the above case using the dye of the present invention, showing a light fastness (4) and a dry cleaning fastness (3).

Example 3

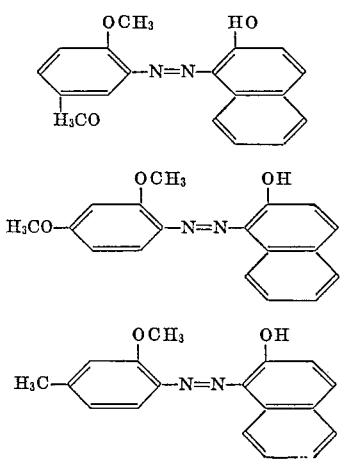

Using each dye represented by the above structural formulae, respectively, nickel stearate-containing polypropylene fibers were dyed (the amount of each dye was 3% OWF), in a similar way to that in Example 1, to obtain respective favorable dyed products in red shade, which were excellent in fastness to light (5<), washing (5) and dry cleaning (5) using perchloroethylene.

What we claim is:

1. A process for dyeing nickel-modified polyolefin material which comprises applying thereto a monoazo dye having the following:

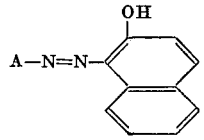

wherein A is selected from the group consisting of

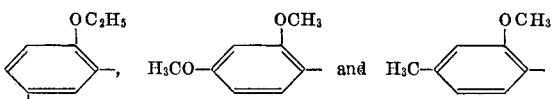

2. A process according to claim 1, wherein the said monoazo dye is

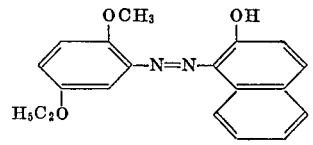

3. A process according to claim 1, wherein the said monoazo dye is

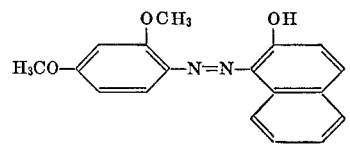

4. A process according to claim 1, wherein the said monoazo dye is

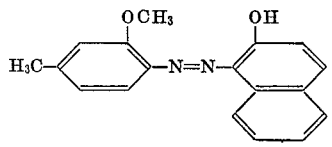

5. A process according to claim 1, wherein the said polyolefin material is polypropylene textile material.

6. An article made of nickel-modified polyolefin material, which is dyed with a monoazo dye having the following formula:

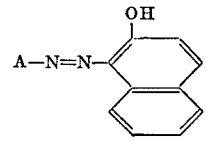

wherein A is selected from the group consisting of

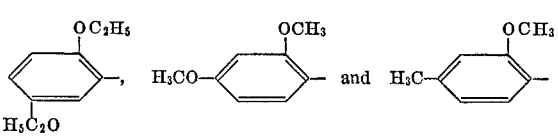

7. An article according to claim 6, wherein the said article is a polypropylene fiber article.

8. An article according to claim 6, wherein the said monoazo dye is

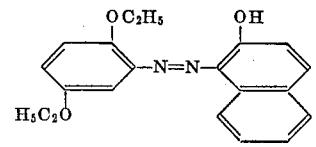

9. An article according to claim 6, wherein the said monoazo dye is
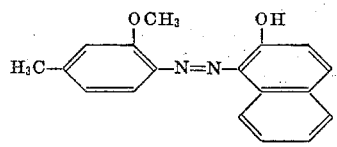
10. An article according to claim 6, wherein the said monoazo is dye
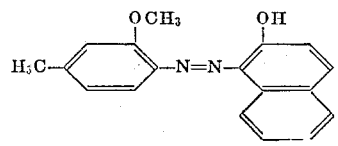
References Cited
UNITED STATES PATENTS
3,096,140  7/1963  Gaetani.
3,164,438  1/1965  Thomas _____ 8—46
FOREIGN PATENTS
642,346  5/1964  Belgium.
699,488  8/1964  Great Britain.
OTHER REFERENCES
Anderson, American Dyestuff Reporter, pages 32–34, Jan. 21, 1963.
NORMAN G. TORCHIN, *Primary Examiner.*
DONALD LEVY, *Assistant Examiner.*